United States Patent Office 3,464,187
Patented Sept. 2, 1969

3,464,187
COMBINED DEGASIFIER AND REACTING CHAMBER
Gothe Oscar Westerlund, % Chemech Engineering Ltd., 401—2695 Granville St., Vancouver, British Columbia, Canada
Filed June 9, 1967, Ser. No. 644,864
Claims priority, application Canada, Feb. 1, 1967, 981,753
Int. Cl. B01d 53/24
U.S. Cl. 55—199   8 Claims

ABSTRACT OF THE DISCLOSURE

In a reaction vessel involving liquor containing entrained gases, the entrained gases are removed from the liquor by the use of a concentrically disposed degasifier chamber connected by weir means to a main liquor chamber, whereby liquor overflows the weir means from the liquor chamber to the degasifier chamber, there being restricted egress means from the degasifier chamber to discharge liquor in turbulent flow therefrom, there also being a weir-type divider disposed within the main liquor chamber.

---

This invention relates to a reaction apparatus. It relates to apparatus for assuring optimum rentention and reaction time within a reaction vessel, particularly where corrosive liquor is being reacted. It also relates to apparatus wherein entrained or occluded gases may be efficiently removed from the reaction liquor. More particularly, it relates to a combined degasifier-reactor for both removing an optimum amount of entrained or occluded gases from the reaction liquor and then for assuring optimum retention and reaction time within the combined degasifier-reactor.

Many chemical procedures are known in which it is desired that reaction take place in a reaction vessel for a particularly controlled length of time. This is most easily done in a batch type process. However, for a continuous process, the length of time for the reaction to take place in the reaction vessel, or "retention time" is dependent on the flow rate of the reacting liquid. In many instances, to provide sufficient retention time, a very large reaction vessel or a plurality of smaller vessels may have to be used. This of course is uneconomical.

Alternatively, baffles may be inserted in the reaction vessel to cause the reacting liquid to assume a sinusoidal path. In most instances, the number of such baffles is so great as to be uneconomical.

A further proposal is to install chemically resistant brick dividing walls to cause the reacting liquid to assume a sinusoidal path. In this instance, chemically resistant brick is relatively expensive and the mortar for the bricks is usually not completely chemically resistant.

Many procedures for the preparation of valuable chemical products involve the production of by-product gases. In many instances, such gases are toxic, noxious and/or explosive. Often, such gases are entrained or occluded in the reaction liquor. It is therefore desirable to remove such gases.

One proposal for removing such gases has been to heat the reaction liquor. In many instances, the reaction to form the final product proceeds through a stage wherein the gas is formed, and then by a final reaction stage. It frequently occurs that the final reaction stage must take place at a fairly low temperature, but in the substantial absence of the by-product gas. Under such circumstances, the degasifier by heating the liquor cannot take place.

An alternative procedure has been to displace the obnoxious, toxic and/or explosive gases by bubbling an inert gas, such as air through the liquor. Obviously, any reaction which should take place in the substantial absence of any gas could take place if such procedure were adopted.

An object of a broad aspect of this invention is the provision of a reaction vessel provided with means for maintaining a preselected retention time.

An object of another aspect of this invention is the provision of a reaction vessel which also includes efficient means for the removal of entrained and/or occluded gases.

An object of yet another aspect of this invention is the provision of a combined degasifier-reactor for use in a chemical plant which could provide a more compact plant, such that capital investment in building, and process piping could be reduced, and the operation thereof could be simplified and maintenance minimized.

By one broad aspect of this invention, apparatus is provided comprising: (a) a liquor chamber; (b) means for admitting liquor to the liquor chamber; (c) a degasifier chamber; (d) weir means interconnecting the liquor chamber and the degasifier chamber, whereby liquor overflows the weir means in flowing from the liquor chamber to the degasifier chamber; (e) a gas chamber connected to both the liquor chamber and the degasifier chamber, whereby gases released in the degasifier chamber rise and are led to the gas chamber; (f) gas outlet means from the gas chamber; (g) a main chamber disposed at least partially around the degasifier chamber; (h) restricted egress, means for the degasifier chamber to the main chamber, whereby liquor discharges as a turbulent flow from the degasifier chamber to said main chamber; (i) a weir-type divider separating the main chamber into an entrance chamber, connected to the degasifier chamber and an outlet chamber, whereby liquor overflows the weir-type divider in flowing from the entrance chamber to the outlet chamber; and (j) outlet means from the outlet chamber, the outlet means being disposed an optimum distance from the weir-type divider.

In one embodiment of such apparatus the degasifier chamber is concentrically disposed within the main chamber.

In another embodiment of such apparatus, the main chamber is provided with a pair of diametrically opposed radial weir-type divider walls separating the main chamber into two chambers of approximately equal size.

In yet another embodiment of such apparatus, the gas chamber is provided with a solid cover, whereby to maintain a controlled volume gas zone.

In still another embodiment of such apparatus, the gas chamber is provided with a flexible diaphragm, whereby to compensate for fluctuation in the flow of said liquor.

By another aspect of this invention, such an apparatus is provided in which the gas chamber is disposed horizontally above said liquor chamber, the gas chamber being separated from said liquor chamber by a gas-liquor interface.

By yet another aspect of this invention such apparatus is provided in which the weir means comprises one wall of a constant level liquor chamber, the constant level liquor chamber being connected to the degasifier chamber by a channel disposed on the downstream side of said weir.

According to still another aspect of this invention, such apparatus is provided in which the weir means comprises a pair of diametrically opposed walls of an open top, horizontal, partially cylindrical liquor distributor.

By yet a further aspect of this invention, such apparatus is provided in which the restricted egress it as the bottom of said degasifier chamber.

In an embodiment of such aspect, the restricted egress comprises a port, subtending an angle between 120 and 150° formed in an outwardly, upwardly sloping bottom wall of the degasifier chamber, the bottom wall sloping at an angle of between 10 and 25°.

A preferred use of the reaction vessel of one aspect of the present invention is in the process for the manufacture of chlorate, as disclosed and claimed in Canadian application Ser. No. 901,153, filed Apr. 24, 1964, now Canadian Patent No. 741,778 issued Aug. 30, 1966. That application is concerned with the well-known procedure for the production of metal chlorates, particularly alkali metal chlorates. It is well-known that alkali metal chlorates may be prepared by electrolysis of an aqueous solution of an alkali metal chloride. In this process elemental chlorine is evolved at the anode and alkali metal hydroxide at the cathode. However, in the conventional cells, since there is no diaphragm between the cathode and the anode, the primary products of the electrolysis react to form the alkali metal chlorate.

The simplified reaction in the aforesaid electrolysis may be summarized as:

$$MtCl + 3H_2O + 6 \text{ Faradays} \rightarrow MtClO_3 + 3H_2$$

wherein Mt is a metal.

The main reactions in the electrolytic preparation of the metal chlorate from the metal chloride may be represented as follows:

Primary reactions (A) At the anode:

$$2MtCl \rightleftharpoons 2Mt^+ + 2Cl^- \rightarrow Cl_2 + 2e^- + 2Mt^+ \quad (1)$$

(B) At the cathode:

$$2H_2O \rightleftharpoons 2H^+ + 2OH^- + 2e^- \rightarrow H_2 + 2OH^- \quad (2)$$

Secondary reactions $$(C) \quad Cl_2 + OH^- \rightarrow ClOH + Cl^- \quad (3)$$

$$ClOH \rightleftharpoons H + OCl^- \quad (4)$$

$$(D) \quad 2ClOH + ClO^- \rightarrow ClO_3^- + 2Cl^- + 2H^+ \quad (5)$$

The secondary reactions are those whose efficiency depends on time, temperature and pH. Since the temperature and pH are constant, the optimum results can be achieved, in any one reaction vessel, by a maximum utilization of such vessel. It is important in such reaction to avoid short circuiting and channeling to maintain a constant reaction or retention time. The reaction vessel of a broad aspect of the present invention admirably achieves such objects.

As the electrolysis described above proceeds, effluent, consisting of $Cl_2$, $Na^+$, $H_2$, $OH^-$, $ClOH$, $Cl^-$, $H^+$, and $OCl^-$, and occluded and/or entrained gases, which consist of $H_2$, $H_2O$, (vapor), $O_2$ $CO_2$ and $Cl_2$, pass means for conducting degasification and reaction.

The cross-sectional area of any such degasifier-reactor 18 should be specifically designed and be of such a size that the liquor velocity is reduced to such an extent that optimum separation of the entrained gases takes place without short circuiting through the tank, which would result from too low a liquor velocity. The velocity, on the other hand, must be sufficient to utilize the entire vessel and to minimize the presence of stagnant liquor but not too rapid to inhibit the expulsion of the entrained gases. The optimum velocity is a function of the apparent density of the liquor, which, in turn, is dependent on the amount of entrained gases and the bubble size. It has been found that a liquor velocity of at least 1 ft./minute to as high as 5 ft./minute or more is satisfactory, e.g. a velocity of about 2 ft./minute can separate more than 95% of the entrapped gases.

In one preferred aspect of this invention, then the degasifier-reactor is for the purpose of permitting the reaction $$2ClOH + ClO^- \rightarrow ClO_3^- + 2Cl^- \quad (5)$$

to take place. For any selected temperature, the retention time in the degasifier-reactor is a function of the concentration of ClOH and ClO⁻ present in the liquor which, in turn, is directly related to the current density. To yield a current efficiency of greater than 90%, with a constant recirculation of liquor and a pH of 6.5, the current density should be less than 4.5 amps/litre at 50° C. or less than 3 amps/litre at 35° C. The current density (in amps/litre) is the main determining factor in calculating the reacting chamber volume. The retention time, on the other hand, is dependent on the rate of liquor circulation, as well as on the volume of the reaction vessel.

In this preferred aspect of this invention, it is important to maintain the reaction temperature as close to 45° C. as possible, while maintaining a reaction time which is optimum for the desirable reaction $$NaOCl + 2HClO \rightarrow NaClO_3 + 2HCl$$

Nevertheless, the concentration of hypochlorite should be minimized, for if it is too high, it will decompose, as shown by the equations $$2HClO \rightarrow 2HCl + O_2$$

and $$HClO + HCl \rightarrow H_2O + Cl_2$$

This would result in the formation of gases, thereby destroying the effectiveness of this invention.

Finally, the pH should be less than 7, and should preferably be between about 5 and 7. At a pH of 6.8, the optimum reaction which, in the presence of the ions contained in the reaction liquor, permits 2 moles of HClO to be converted to 1 mole of NaOCl. This optimum pH value is somewhat lower when dichromate ions are present in the solution.

In one embodiment of this invention which will be described in greater detail hereinafter, a constant level liquor chamber is provided. The gas zone could then be reduced to a minimum, thereby minimizing hazards from explosions.

Furthermore, in this embodiment, since the process liquor level may vary from time to time, the effect in the gas volume will be small. The constant level liquor chamber should have a cross sectional area at least 70% and preferably more than 90% of the cross-sectional area of the degasifier chamber.

In yet another embodiment of the invention which will also be described hereinafter, a substantially constant gas volume is provided. The gases removed by the degasifier-reactor may have the following composition.

| | Percent by volume |
|---|---|
| Hydrogen ($H_2$) | 89–94 |
| Water vapor ($H_2O$) | 3–6 |
| Oxygen ($O_2$) | 2–4 |
| Carbon dioxide ($CO_2$) | 0.3–0.6 |
| Chlorine ($Cl_2$) | 0.2–1 |

It is observed that the gases contain chlorine, and consequently, the gases should be treated to remove the chlorine prior to discharge into the atmosphere, in order to avoid air pollution. This may be done by alkaline scrubbing, or by combustion, e.g., $$H_2 + Cl_2 \rightarrow 2HCl$$

thereby producing and recovering hydrochloric acid by scrubbing with water.

Furthermore, it may be desirable to recover the hydrogen gas.

It is therefore desirable to provide a minimum gas phase above the liquor level in order to insure optimum safety from explosion hazards. The liquor level, however, varies considerably, for example, due to changes in the current load to the electrolytic cells. In the embodiment to be described, a flexing diaphragm is provided which will float on the liquor and rise or fall with changes in the liquor level. This should maintain an essentially constant gas volume.

In the embodiments described herein the vessels could be fabricated from titanium, rubber lined steel, or any other material which is resistant to the corrosive influence of the liquor.

In the accompanying drawings.

Figure 1:
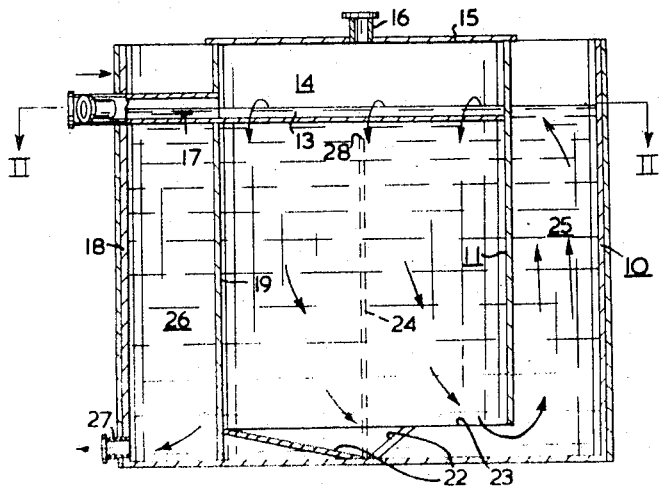
FIG. 1 is a central longitudinal cross-section of an apparatus according to one embodiment of this invention.
Figure 2:
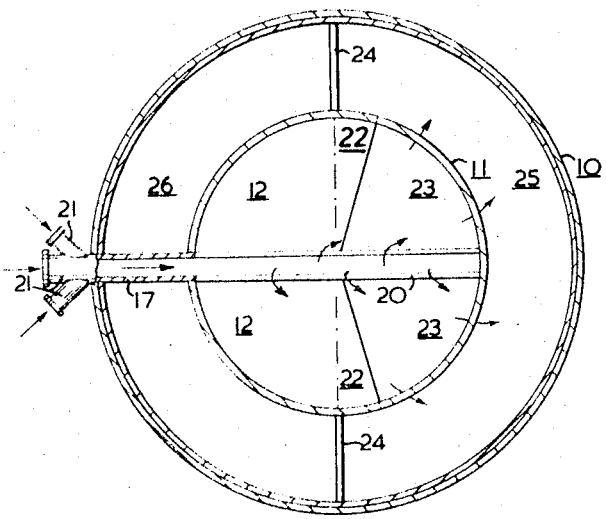
FIG. 2 is a section along the line II—II of FIG. 1.

Turning now to FIGS. 1 and 2, the apparatus of this aspect of this invention may be seen to consist of a main chamber 10 in which is concentrically disposed a degasifier chamber 11. The upper portion of the degasifier chamber 11 is provided with a liquor chamber 12 which is bisected by a liquor distributor 13. Disposed horizontally above liquor chamber 12 is a gas chamber 14, provided with a solid cover 15 and a gas outlet 16.

The liquor distributor 13 is an extension of a horizontally disposed liquor inlet conduit 17 which leads from the outside of wall 18 of the main chamber 10 to the inside of wall 19 of the degasifier chamber 11. Liquor distributor 13 is formed by removing the upper portion of the extension of conduit 17, to provide a pair of opposed, parallel weirs 20. Leading to liquor inlet 17 are three inlet nozzles 21, for the liquor to be degasified.

Degasifier chamber 11 is provided with an outwardly upwardly sloping bottom wall 22, which may slope upwardly at an angle ranging from about 10° to about 25°, although it is shown as an angle of about 22°. Wall 22 is provided with an egress port 23 which subtends an angle which may vary from about 120° to about 150°, although it is shown as an angle of about 145°. By means of egress port 23, liquor may flow from the degasifier chamber 11 to the main chamber 10.

Main chamber 10 is provided with a pair of diametrically opposed radial weir-type divider walls 24 which separate the main chamber into an inlet chamber 25 and an outlet chamber 26, chambers 25 and 26 being of approximately equal volume. Disposed at the bottom of outlet chamber 26 is an outlet conduit 27.

It is important that the outlet 27 from outlet chamber 26 be an optimum distance away from the weir 28 provided by the weir-type divider walls 24, i.e., it should be as far away as possible to minimize channeling. While only two weir-type divider walls have been shown, so that there are two chambers, it is possible to provide three, four or more divider walls to provide one, two or more intermediate chambers between the inlet chamber and the outlet chamber. The divider walls are so dispersed that the liquor is forced to follow a maximum path, namely a sinusoidal path, from the egress port 23 to the outlet conduit 27.

In operation, the liquor to be degasified is fed to the apparatus by means of nozzles 21 and inlet conduit 17 to liquor distributor 13. As the liquor cascades over weirs 20 the major amount of gas dissolved or occluded in the liquor is released, to rise to the gas chamber 14. The liquor then flows downwardly to egress port 23. Since egress port 23 is a constricted outlet, some turbulence exists, and this too causes any further amount of gas to be released from the liquor and to rise to the gas chamber 14.

The substantially completely degasified liquor passes through egress port 23 to inlet chamber 25. Here it is caused to flow upwardly to overflow the weirs 28 of the weir-type divider walls 24 and is caused to flow downwardly in outlet chamber 26 to outlet conduit 27.

It is possible to reverse the liquor flow by admitting the liquor to the bottom of degasifier chamber 11, so that gas would flow concurrently with the liquor. This is not usually desirable since, firstly turbulence causing nozzles must be provided instead of overflow weirs 20, and secondly, the gas evolved in this embodiment is not as easy to collect.

In one embodiment of this aspect of this invention, an apparatus was designed of titanium and was externally reinforced with mild steel reinforcing grid. The degasifier chamber was about 16 ft. in diameter and about 21 ft. tall. The main chamber was about 28 ft. in diameter and about 18½ ft. tall. The divider walls were about 14 ft. high. The apparatus was designed for a throughput of about 3,000 U.S. gallons/minute, with the divider walls so designed that 1,500 U.S. gallons/minute would overflow the weirs. The particular liquor being degasified, a chloride-chlorate liquor had a specific gravity of 1.5 and was degasified at a temperature of 40–45° C.

Figure 3:
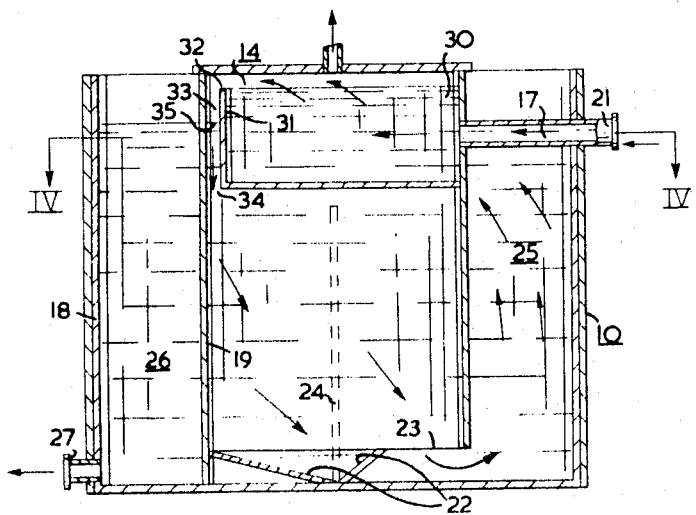
FIG. 3 is a central longitudinal cross-section of an apparatus according to a second aspect of this invention.
Figure 4:
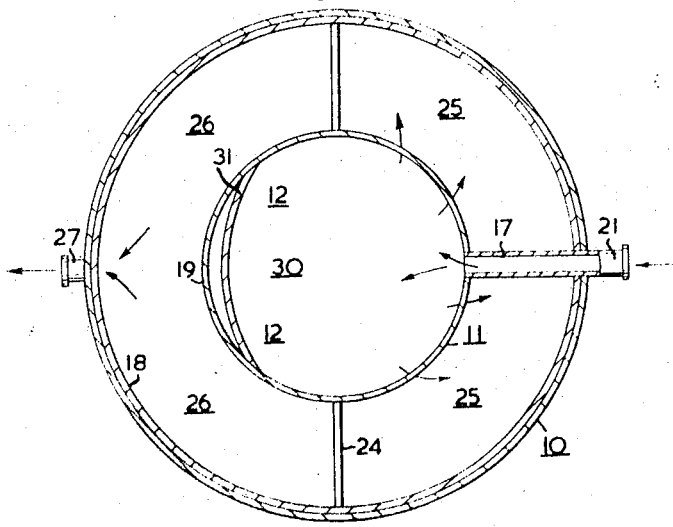
FIG. 4 is a section along the line IV—IV of FIG. 3.

The embodiment of apparatus shown in FIGS. 3 and 4 is similar to that in FIGS. 1 and 2, with the exception that it is provided with a different construction of liquor chamber 12 and weirs 20. Since all other components are the same, they will not be further described.

Thus, the embodiment in FIGS. 3 and 4 provides a constant level liquor chamber 30. The substantially horizontal inlet conduit 17 discharges directly into central liquor chamber 30. One wall 31 of central liquor chamber 30 is in the form of a slightly bowed chord between opposed walls of liquor chamber 30. The liquor cascades over weir 32 provided by the top of wall 31, and falls, waterfall-like, through a gas channel 33 and then passes downwardly through liquor channel 34. Central liquor chamber 30 acts both as a degasifier and as a reacting chamber and is designed to ensure a minimum liquor level by the overflow weir 32. In this way a considerable increase in efficiency of degasification is achieved, because of the distance the liquor must fall before it strikes interface 35 between the gas channel 33 and the liquor channel 34. Gas channel 33 leads to gas chamber 14, while liquor channel 34 leads to reacting chamber 11. The gas chamber consequently has a controlled minimum volume gas zone.

The operation of the embodiment shown in FIGS. 3 and 4 is otherwise the same as the operation of the embodiment shown in FIGS. 1 and 2.

Figure 5:
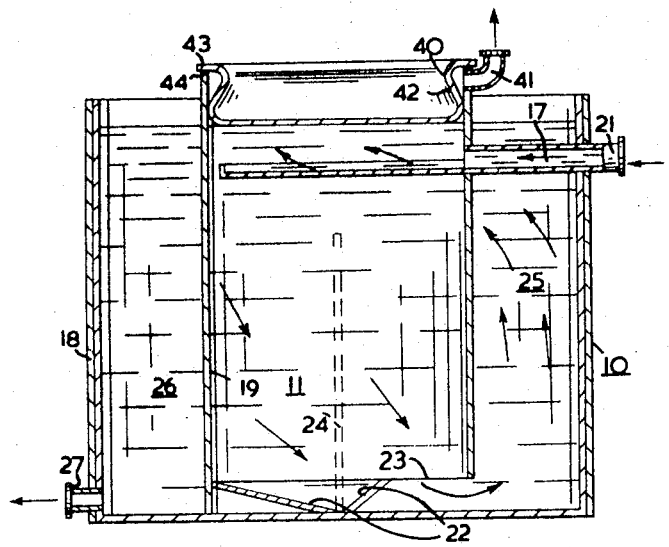
FIG. 5 is a central longitudinal cross-section of an apparatus according to a third embodiment of this invention.

The embodiment shown in FIG. 5 provides a different type cover for the gas chamber 14. While it is shown as a modification of the embodiment of FIGS. 1 and 2, it can also be used in the embodiment of FIGS. 3 and 4. Since only the cover 15 for the gas chamber 14 has been altered, the other structural features will not be described.

Thus, in the embodiment shown in FIG. 5, the cover 40 is formed of a flexible resilient material, and consequently may better be termed a flexing diaphragm. It may be formed of any suitable material, for example, natural rubber, or such synthetic rubbers as GRS, GRN, Buna-N, Buna-S and butyl, or other materials known by the trademarks of Kel-F and Teflon (i.e., polytetrafluoroethylene) or by the trademark of Hypalon, a chlorosulfonated polyethylene of E. I. du Pont de Nemours & Co. The diaphragm changes its level in accordance with fluctuation in the liquor level, and consequently the gas chamber 42 varies in volume. The gas outlet 41 leads from gas chamber 40. A seal indicated generally as 43 is provided between the edge of diaphragm 40 and the flange 44 of the degasifier chamber 11.

Thus, the diaphragm changes elevation depending on the fluctuation of the flow of liquor. However, the operation of the embodiment of FIG. 5 is otherwise similar to the operation of the embodiments of FIGS. 1–4.

I claim:
1. Apparatus comprising:
 (a) a liquor chamber;
 (b) means for admitting liquor to said liquor chamber;
 (c) a degasifier chamber;
 (d) weir means interconnecting said liquor chamber and said degasifier chamber, constructed so that liquor overflows said weir means in flowing from said liquor chamber to said degasifier chamber;
 (e) a gas chamber connected to both said liquor chamber and said degasifier chamber, constructed so that gases released in said degasifier chamber rise and are led to said gas chamber;

(f) flexible diaphragm means provided in said gas chamber, to compensate for fluctuation in the flow of said liquor;

(g) gas outlet means from said gas chamber;

(h) a main chamber disposed at least partially around said degasifier chamber;

(i) restricted egress means from said degasifier chamber into said main chamber, through which liquor discharges as a turbulent flow from said degasifier chamber to said main chamber;

(j) weir-type dividers separating said main chamber into an entrance chamber connected to said degasifier chamber and an outlet chamber, constructed so that liquor overflows said weir-type divider in flowing from said entrance chamber to said outlet chamber and (k) outlet means from said outlet chamber, said outlet means being disposed an optimum distance from said weir-type divider.

2. The apparatus of claim 1 wherein said degasifier chamber is concentrically disposed within said main chamber.

3. The apparatus of claim 2 wherein said main chamber is provided with a pair of diametrically opposed radial weir-type divider walls separating said main chamber into two chambers of approximately equal size.

4. The apparatus of claim 1 wherein said gas chamber is disposed horizontally above said liquor chamber, said gas chamber being separated from said liquor chamber by a gas-liquor interface.

5. The apparatus of claim 1 wherein said weir means comprises one wall of a constant level liquor chamber, said constant level liquor chamber being connected to said degasifier chamber by a channel disposed on the downstream side of said weir.

6. The apparatus of claim 1 wherein said weir means comprises a pair of diametrically opposed walls of an open top, horizontal, partially cylindrical liquor distributor.

7. The apparatus of claim 1 wherein said restricted egress is at the bottom of said degasifier chamber.

8. The apparatus of claim 1 wherein said restricted egress comprises a port, subtending an angle between 120° and 150° formed in an outwardly upwardly sloping bottom wall of said degasifier chamber, said bottom wall sloping at an angle of between 10° and 25°.

References Cited

UNITED STATES PATENTS

| | | | |
|---|---|---|---|
| 1,118,267 | 11/1914 | Burhorn | 261—114 |
| 1,211,184 | 1/1917 | Lagergren | 55—190 X |
| 2,973,189 | 2/1961 | Ju Chin Chu | 261—114 |

REUBEN FRIEDMAN, Primary Examiner

R. W. BURKS, Assistant Examiner